(12) United States Patent
Clevorn

(10) Patent No.: US 8,938,243 B2
(45) Date of Patent: Jan. 20, 2015

(54) RADIO RECEIVER APPARATUS OF A CELLULAR RADIO NETWORK

(75) Inventor: Thorsten Clevorn, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 246 days.

(21) Appl. No.: 13/306,081

(22) Filed: Nov. 29, 2011

(65) Prior Publication Data

US 2013/0137440 A1 May 30, 2013

(51) Int. Cl.
*H04W 36/00* (2009.01)
*H04B 7/02* (2006.01)
*H04W 72/00* (2009.01)
*H04W 4/00* (2009.01)

(52) U.S. Cl.
USPC ........ 455/442; 455/101; 455/436; 455/452.1; 370/329; 370/334

(58) Field of Classification Search
USPC ............. 455/13.4, 101, 436–444, 450–452.1; 370/252, 328–334, 491, 500; 375/267, 375/299, 347
See application file for complete search history.

(56) References Cited

U.S. PATENT DOCUMENTS

| | | | |
|---|---|---|---|
| 2004/0224692 A1* | 11/2004 | Hamabe | 455/442 |
| 2006/0040668 A1* | 2/2006 | Hokao | 455/437 |
| 2008/0064408 A1* | 3/2008 | Lindoff | 455/442 |
| 2008/0207186 A1* | 8/2008 | Kawamoto et al. | 455/418 |
| 2009/0190517 A1* | 7/2009 | Maezawa | 370/312 |
| 2009/0275337 A1* | 11/2009 | Maeda et al. | 455/442 |
| 2010/0136979 A1 | 6/2010 | Yang et al. | |

* cited by examiner

*Primary Examiner* — Michael Mapa
(74) *Attorney, Agent, or Firm* — Eschweiler & Associates, LLC

(57) ABSTRACT

A radio receiver apparatus of a cellular network, wherein the network allocates one or more cells to a particular connection of the radio receiver apparatus based on a feedback signal received from the radio receiver apparatus. The radio receiver apparatus includes a first measurement unit configured to measure at least one cell-specific first quantity indicative of a channel quality of a dedicated downlink channel. Further, the radio receiver apparatus includes a feedback signal generating unit configured to generate the feedback signal on the basis of the first quantity.

14 Claims, 6 Drawing Sheets

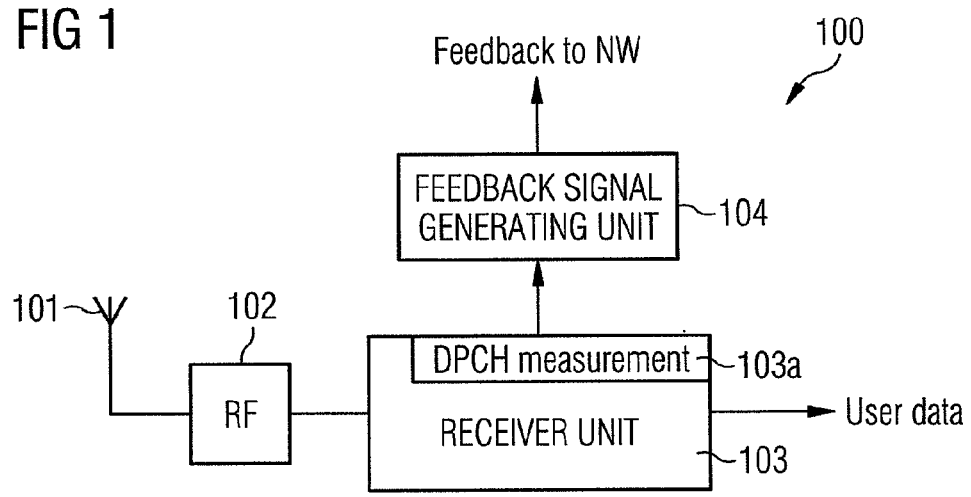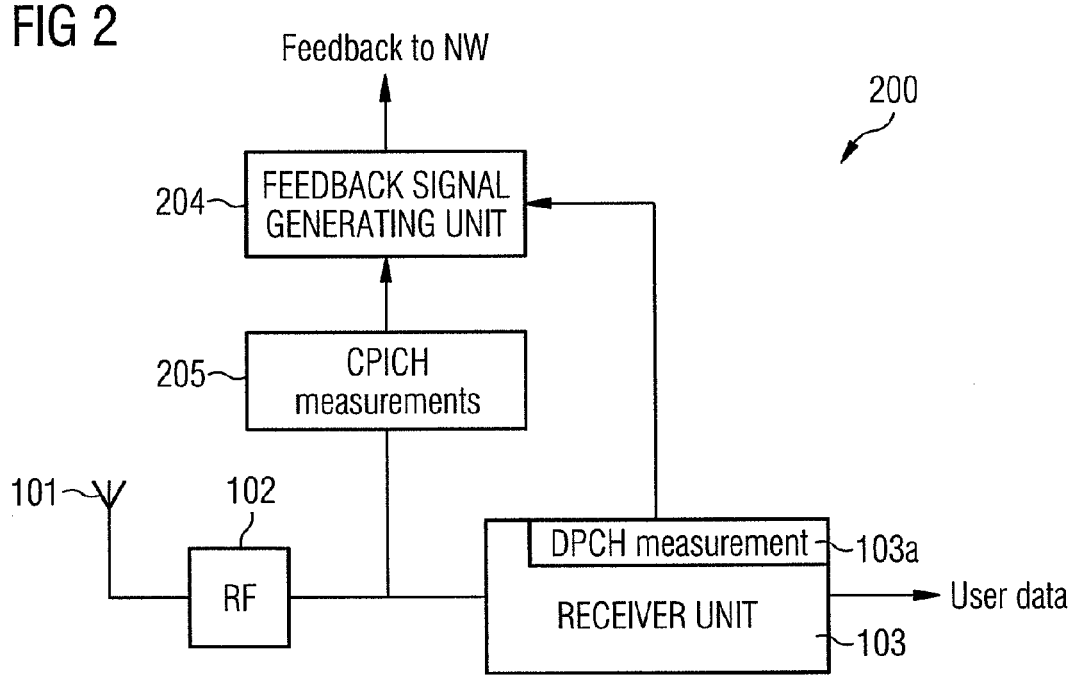

RADIO RECEIVER APPARATUS OF A CELLULAR RADIO NETWORK

FIELD

The invention relates to handover techniques in cellular radio communications systems, and more particularly to a radio receiver apparatus allocated to one or more cells of a cellular radio network.

BACKGROUND

Cell handover is used in radio receiver apparatus when traversing through overlapping and/or adjacent radio cells of the cellular radio network. It is desirable to provide for a high receiver performance in the presence of one or more cells.

BRIEF DESCRIPTION OF THE DRAWINGS

Aspects of the invention are made more evident by way of example in the following detailed description of embodiments when read in conjunction with the attached drawing figures, wherein:

FIG. 1 is a schematic block diagram of a radio receiver apparatus in accordance with one embodiment;

FIG. 2 is a schematic block diagram of a radio receiver apparatus in accordance with one embodiment;

DETAILED DESCRIPTION

Figure 3:
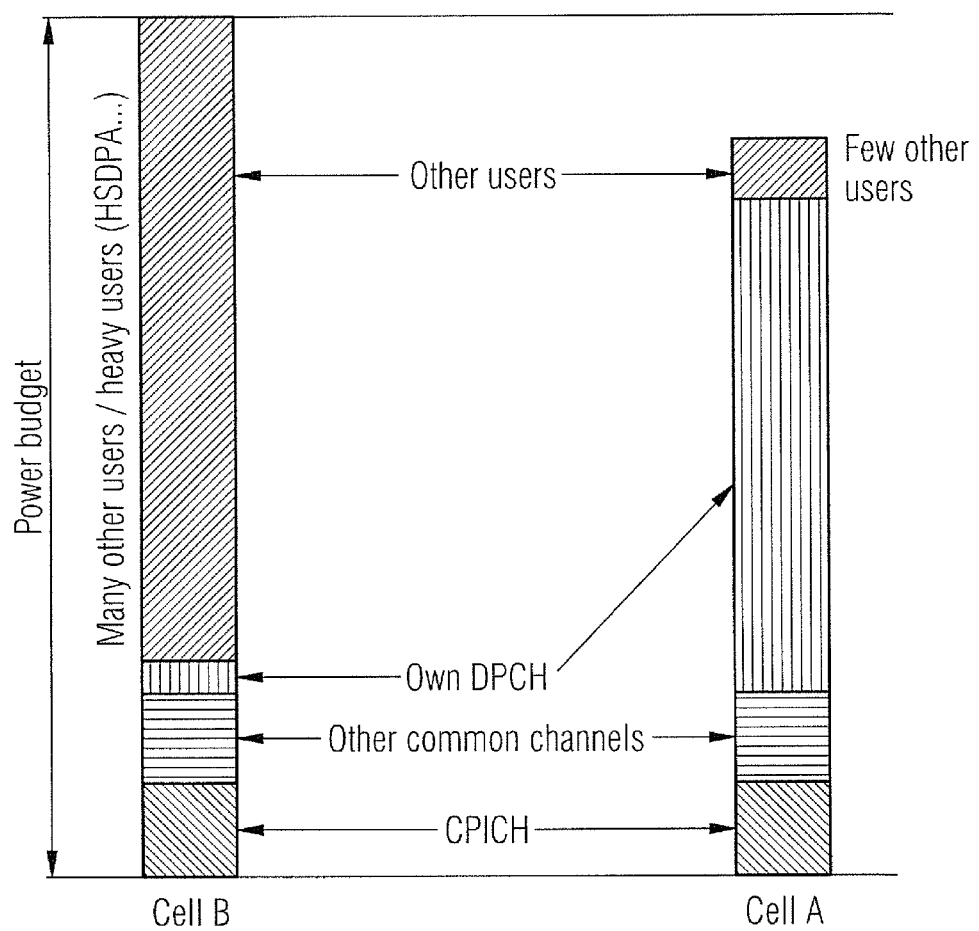
FIG. 3 is a schematic diagram depicting an example for dedicated channel power allocation to a radio receiver apparatus.

In the following description and claims, the terms "coupled" and "connected", along with derivatives may be used. It should be understood that these terms may be used to indicate that two elements co-operate or interact with each other regardless of whether or not they are in direct physical or electrical contact.

It should be understood that embodiments of the invention may be implemented in discrete circuits, partially integrated circuits or fully integrated circuits.

Furthermore, it should be understood that embodiments of the invention may be implemented in software or in dedicated hardware or partially in software and partially in dedicated hardware.

By way of example, some parts of the following description relate to a radio receiver apparatus operated in a CDMA (Code Division Multiple Access) cellular radio network, e.g. in an UMTS (Universal Mobile Telecommunications System) cellular radio network.

Some parts of the following description relate to a radio receiver apparatus operating in a cellular network configured to support soft handover. In soft handover, the radio receiver apparatus always has a radio connection to one or more cells. By way of example, UMTS networks support soft handover.

"Softer handover" is a special case of soft handover. Therefore, softer handover will be referred to as soft handover in the following unless explicitly stated otherwise. As known in the art, softer handover is a handover between different cells of one base station (base stations are also referred to as NodeB or eNodeB in the art). Such different cells of one base station may be established by multiple antenna sectors at the base station, with each antenna sector defining a cell and using a cell-specific scrambling code.

Some parts of the following description relate to a radio receiver apparatus operating in a cellular network configured to support hard handover. In hard handover, the radio connection in one cell is lost before a new radio connection in another cell is established. By way of example, GSM (Global System for Mobile Communications) and some multi-carrier modulation systems such as, e.g., orthogonal frequency division multiplexing (OFDM) radio communications systems including systems as stipulated in the LTE (Long Term Evolution) standard may use hard handover.

A radio communications system using soft handover may also be configured to use hard handover. By way of example, hard handover is also possible in UMTS systems.

A mobile receiver apparatus as described herein may form a part of a mobile station of a wireless network. In the following the terms mobile station and user equipment (UE) shall have the same meaning, which meaning shall comprise the definitions given in the various standards (e.g. GSM, UMTS, LTE and derivatives thereof). In the following the term UE is used. By way of example, a UE may be represented by a cellular phone, a smart phone, a tablet PC, a laptop, etc.

In a wireless network for mobile UEs with numerous cells the network and the UE have a mechanism to decide to which cell the UE is to be connected. Usually, this should be the best cell. When the UE is moving, a decision has to be made when to handover the UE to the next cell. In a soft handover wireless network, where the UE is connected to several cells at the same time (in case of UMTS e.g. up to six cells), the UE has an "active set" of cells to which it is connected and a "monitored set" of cells which are monitored but to which it is not connected. Active set updating as initiated by the handover decision may comprise various procedures such as, e.g., adding a new cell to the active set, removing a cell from the active set, replacing a cell of the active set by a cell of the monitored set (e.g. if the active set is full) and changing the best cell of the active set.

In hard handover wireless networks like e.g. LTE, the "active set" typically only comprises one cell, namely the serving cell. During hard handover the serving cell is replaced by another cell, which then becomes the serving cell.

In soft handover and hard handover wireless networks the quality of the cells must be determined to decide appropriate cell reallocation, e.g. active set updating or serving cell replacement. To this end, the UE is configured to report cell quality information to the network. The network or, more specifically, a network controller connected to one or more base stations of the network, then evaluates the cell quality information and performs cell reallocation to the UE. These and other concepts are more specifically described by way of example in the following embodiments when read in conjunction with the appended figures.

FIG. 1 is a schematic illustration of some basic building blocks of a radio receiver apparatus 100 of an UE according to one embodiment. The radio receiver apparatus 100 may comprise an antenna 101, an RF (radio frequency) unit 102, a receiver unit 103 and a feedback signal generating unit 104. The antenna 101, which may also comprise multiple antennas, is coupled to an input of the RF unit 102. The RF unit 102 may comprise a down-conversion unit configured to down-convert the received analog signal to an intermediate frequency (IF) or the baseband. The RF unit 102 may comprise further signal processing such as sampling, analog-to-digital conversion, filtering and so forth.

A signal generated by the RF unit 102 is fed into the receiver unit 103. The receiver unit 103 may comprise a demodulator, a channel estimation unit, a descrambling unit, a despreading unit, a combiner, a channel decoding unit and so forth. The receiver unit 103 generates user data for the UE in which the radio receiver apparatus 100 is implemented.

The receiver unit 103 may further comprise or may be connected to a dedicated channel measurement unit 103a. The dedicated channel measurement unit 103a is configured to measure at least one cell-specific first quantity indicative of a channel quality of a dedicated downlink channel. For instance, in UMTS the dedicated downlink channel is denoted as DPCH (Dedicated Physical CHannel). Thus, in UMTS, the cell-specific first quantity measured by the dedicated channel measurement unit 103a is indicative of a cell-specific DPCH quality. The cell-specific first quantity is measured for one or a plurality of cells (e.g. the cells of the active set and the cells of the monitored set).

A quantity indicative of the dedicated downlink channel quality may, for instance, be the absolute power (measured at the UE) carried by the dedicated downlink channel. This quantity may also be referred to as RSCP (received signal code power) of the decoded dedicated downlink channel. Further, the first quantity indicative of a channel quality of a dedicated downlink channel may correspond to a signal-to-noise ratio (SNR) of the decoded dedicated downlink channel. The term SNR as used here should be interpreted to have a broad meaning. By way of example, the term SNR may comprise various different quantities such as, e.g., the chip energy Ec divided by the interference density Io of the decoded dedicated downlink channel (Ec/Io) and/or the bit energy Eb divided by the interference density of the decoded dedicated downlink channel (Eb/Io) and/or the symbol energy Es divided by the interference density Io of the decoded dedicated downlink channel (Es/Io) and/or the chip energy Ec divided by the noise density No of the decoded dedicated downlink channel (Ec/No) and/or the bit energy Eb divided by the noise density No of the decoded dedicated downlink channel (Eb/No) and/or the symbol energy Es divided by the noise density No of the decoded dedicated downlink channel (Es/No) and/or combinations of these quantities. In the following description, by way of example, the quantity Ec/Io is used for the purpose of this example, but could be replaced by any other of the above referenced quantities or combinations thereof.

In one embodiment the dedicated channel measurement unit 103a is configured to measure the first quantity indicative of a demodulation quality of the user's dedicated physical channel for each cell separately. Thus, if the active set and/or the monitored set each comprises a plurality of cells, the actual contribution of each cell to the demodulation quality of the user's dedicated physical channel is measured, and a cell-specific first quantity is indicative of the actual contribution of a specific cell to the demodulation quality of the user's dedicated physical. If the active set only comprises one cell (i.e. the serving cell), the first quantity measured in the dedicated channel measurement unit 103a is indicative of the overall demodulation quality of the dedicated downlink physical channel.

By way of example and without loss of generality, the UE may be connected to two cells A and B. In this case the active set comprises these two cells A and B. The dedicated channel measurement unit 103a may, e.g., measure one or more of a signal power or a signal-to-noise ratio (e.g. RSCP, Ec/Io or SNR) or a combination of these quantities for each of the cells A and B to determine cell quality in view of the downlink dedicated physical channel.

These cell-specific first quantities of cell quality may be communicated to the feedback signal generating unit 104. The feedback signal generating unit 104 is configured to generate a feedback signal based on the at least one cell-specific first quantity. As will be explained further below, the generation of the feedback signal may further be based on other quantities such as, e.g., one or more cell-specific quantities indicative of a channel quality of other downlink physical channels such as, e.g., a common pilot downlink channel. In one embodiment, however, the one or more quantities are directly reported to the network by the feedback signal. The feedback signal generated by the feedback signal generating unit 104 is then transmitted to the network, e.g. to a network controller that is coupled to one or a plurality of base stations (NodeBs or eNodeBs) of the cellular network. The network evaluates the cell-specific feedback signal and decides on the cells currently assigned to the downlink dedicated channel (e.g. DPCH) of the UE, i.e. on the cells that constitute the active set. In particular, an active set update procedure may be decided by the network.

FIG. 2 schematically illustrates a radio receiver apparatus 200 according to one embodiment. Identical or similar units as depicted in FIG. 1 are referenced by the same reference numerals, and description of these units is therefore partly omitted for the sake of brevity. Compared to the radio receiver apparatus 100 the radio receiver apparatus 200 may further comprise a common channel measurement unit 205. An input of the common channel measurement unit 205 may be coupled to an output of the RF unit 102. The common channel measurement unit 205 may be configured to measure at least one cell-specific second quantity indicative of a channel quality of a common pilot channel. In UMTS, by way of example, the common pilot channel is the CPICH (Common Pilot CHannel).

The at least one cell-specific second quantity may be a signal power or a signal-to-noise ratio or a combination thereof. For example, the at least one cell-specific second quantity may be the RSCP of the common pilot channel. As described previously, the RSCP is the received signal code power of the common pilot channel of a specific cell. The cell-specific second quantity may e.g. be the SNR of the common pilot channel. Again, the term SNR may have a broad meaning and may comprise quantities such as, e.g. Ec/Io, Eb/Io, Es/Io, Ec/No, Eb/No, Es/No of the common pilot channel and combinations thereof. As an example, Ec/Io is often used in the following description.

The at least one cell-specific second quantity measured by the common channel measurement unit 205 is communicated to a feedback signal generating unit 204. The feedback signal generating unit 204 also receives the at least one cell-specific first quantity output by the dedicated channel measurement unit 103a. The feedback signal generating unit 204 generates a feedback signal based on the cell-specific first quantity and based on the cell-specific second quantity. The feedback signal generated by the feedback signal generating unit 204 is transmitted to the network (or network controller) and is evaluated and used for handover decisions the same way as described above in conjunction with FIG. 1.

In other words, while the common channel measurement unit 205 provides cell quality information based on a measurement on a common pilot channel, the dedicated channel measurement unit 103a provides cell quality information based on a measurement on a demodulated dedicated channel. It will be explained in the following that these two types of cell quality information are not equivalent to each other and that a concept of utilizing the first quantity indicative of a cell quality based on a dedicated channel measurement may improve cell allocation (e.g. handover). It may thus decrease the probability of a drop of the connection and/or it may improve the capacity of the network.

In conventional cellular networks such as UMTS, the quality of cells is determined by measuring the RSCP or the Ec/Io of the common pilot channel (CPICH). Typically, the common pilot channel is transmitted with a constant power throughout all base stations. However, dedicated downlink channels such as DPCH may be power controlled, i.e. each UE requests more or less transmit power for its dedicated physical channel from the cells in the active set. In specific scenarios, however, the network may not or can not strictly follow these requests. Thus, the actual contribution of each cell to the demodulation quality of the users dedicated physical channel (e.g. DPCH) may change in time. It may even change in time if the UE is not moved.

By way of example, the network may not be able to follow the power control requests of an UE because every cell only has a certain power budget to be shared amongst the users and the common channels, and because the load (number of users, demands of users for data rate, etc.) of every cell may be different. Thus, the dedicated channel transmit power of a connection to a UE is usually different for different cells.

The dedicated physical channel power deviations from cell to cell and variations of dedicated physical channel transmit power in time in each cell are not reflected by measurement of a cell quality based on a common pilot channel. In other words, a measurement based on a common pilot channel may not consider in each case the actual importance of each cell for the UE. Therefore, active set update procedures only relying on a channel quality measurement based on a common pilot channel may lead to non-optimum active set updated decisions such as, e.g., removal of an important cell from the active set or replacement of a cell of the active set by a cell of the monitored set of less importance. Such non-optimum or erroneous active set update procedures may lead to a decrease in the quality of the connection or the data rate and may even lead to a drop of connection. From a network's point of view, non-optimum or erroneous active set update procedures may lead to a reduction in capacity of the network.

According to an embodiment described herein, the actual contribution of each cell to the demodulation quality is taken into account by providing the feedback signal generating unit 104, 204 with the at least one cell-specific first quantity (e.g. RSCP and/or Ec/Io and/or SNR or a combination thereof) indicative of a channel quality of the dedicated physical downlink channel. The feedback signal returned to the network is then generated based on this quality information and may therefore enable the network (e.g. network controller) to improve active set update procedures.

For the sake of simplicity, concepts of the invention will be explained in the following by way of example. Without loss of generality, the example is related to UMTS. The example may, however, apply to other standards as mentioned above. Further, in this example, effects like fading, multi-path propagation, channel estimation and interference are neglected.

According to FIG. 3, the UE under consideration may be connected to two cells A and B. The UE may contain a radio receiver apparatus 100, 200 according to embodiments described herein. In this example, the cell B may e.g. be located at an airport and may have a lot of users. These users may e.g. generate also heavy HSDPA (High Speed Downlink Packet Access) data traffic. The power budget of this cell B may be at its limit and the DPCH of the UE under consideration may therefore get only a small transmit power for its DPCH from cell B. This is depicted on the left side portion as "own DPCH" in FIG. 3. In this example, this may not be a problem since there is a second cell A, which is not at its limit, i.e. the overall transmit power of cell A is below its power budget. By way of example, the second cell A may be located in the rural area next to the airport. This cell A has only a few users and thus can allocate a large part of its transmit power budget to the DPCH of the UE under consideration (i.e. the "own DPCH").

Assuming that the UE sees the common pilot channel CPICH from both cells A and B with equal strength, it is apparent from FIG. 3 that nevertheless, the cell B actually does not contribute much to the DPCH quality. Further, it is apparent from FIG. 3 that changing this (i.e. increasing the DPCH power) of cell B is not possible because the other users are blocking the power budget in cell B. Therefore, in this scenario, the cell A is the important cell for the UE under consideration. However, since the UE sees the CPICH from both cells A and B with equal strength (e.g. identical RSCP and/or identical Ec/Io and/or identical SNR), the fact that cell A is more important than cell B for the demodulation quality of the DPCH could not be obtained by a measurement on the CPICH alone, i.e. a measurement of the cell-specific second quantity. Nevertheless, as long as both cells A and B are in the active set, everything would work fine even in case of a measurement on the CPICH alone.

However, if then the UE moves towards cell B at the airport, the CPICH power of cell B seen by the UE improves and the CPICH power of cell A seen by the UE degrades. If the cell allocation procedure in the network would only be based on the CPICH power, the cell A may then be removed from the active set although it is still the important cell for the UE. More specifically, as will be explained in detail further below, the UE may request the removal of cell A from the active set once the CPICH power of cell A falls under a reporting threshold and stays under this reporting threshold for more than a specific duration, the so-called time to trigger (TTT). However, still assuming that this procedure is only based on CPICH measurement data, such removal of cell A would be erroneous because cell A would still contribute the majority of power (or SNR) to the DPCH seen at the UE.

Further following the example, if cell A would be removed, cell B would have to significantly increase the DPCH transmit power for the UE under consideration to compensate for the loss of important DPCH power contribution from cell A. However, as depicted in FIG. 3, cell B would have no spare power in its budget. Thus, the DPCH power and also the DPCH SNR of the UE under consideration would drop significantly and the call may even drop. Alternatively, the cell B would have to degrade or drop other users in order to increase the DPCH transmit power to the UE under consideration, which is also not desirable and would reduce the capacity of the network.

Still considering the above example with a 10 dB higher DPCH power or SNR of cell A than cell B when the UE sees the common pilot channel CPICH from both cells A and B with equal strength, the correct cell allocation decision would actually be to remove cell B from the active set, because the contribution of cell B to the DPCH power or SNR is much smaller than the contribution of cell A. It is to be noted that removing cell B from the active set is exactly the opposite of what would have been decided on the basis of CPICH measurement data alone. Removing cell B would free up at least a small portion of the power budget of cell B for the benefit of other users. Only when the UE is very close to cell B and cell A becomes very weak, a handover from cell A to cell B should be performed.

According to embodiments described herein, at least one cell-specific first quantity obtained by a measurement of the UE dedicated downlink channel is considered in order to avoid erroneous active set update decisions such as described above. By considering a cell-specific first quantity obtained by a measurement on the UE dedicated channel, cell allocation (i.e. handover) may be improved.

According to at least one embodiment described herein, the UE could modify its feedback signal reportings (e.g. RSCP and/or Ec/Io) to the network by cell-wise combining the at least first quantity and the at least second quantity to derive a combined third quantity which is then used by the network for cell reallocation purposes (e.g. active set update). In this case, the network does not necessarily need to know that the UE generates modified or "corrected" reportings, i.e. the network may operate on the modified reportings (i.e. the combined third quantity) the same way as before on e.g. the second quantity. Further, it may not be necessary to change the standard, because the feedback signal received at the network may simply be evaluated the same way as before.

By way of example and without loss of generality, the UMTS standard is considered. According to the UMTS standard, the feedback signal reportings comprise cell-wise RSCP measurement values and cell-wise Ec/Io measurement values obtained by CPICH measurements and representing what has previously been referred to as second quantities. According to embodiments described herein, cell-wise measurement values of the DPCH (e.g. power or SNR values) representing the first quantities are incorporated into the reportings. In some embodiments described herein, incorporation of the cell-wise measurement values of the DPCH means that these cell-wise measurement values are combined with corresponding cell-wise measurement values of the CPICH and reported as third quantities (i.e. modified second quantities) to the network. Thus, the reported cell-wise RSCP measurement values and the reported cell-wise Ec/Io measurement values of the feedback signal then contain contributions derived from the cell-wise DPCH measurement values. These DPCH contributions may improve the reported values in view of the cell allocation procedure performed by the network, but neither the UMTS standard nor the cell allocation procedure at the network has to be changed to this end.

Figure 4:
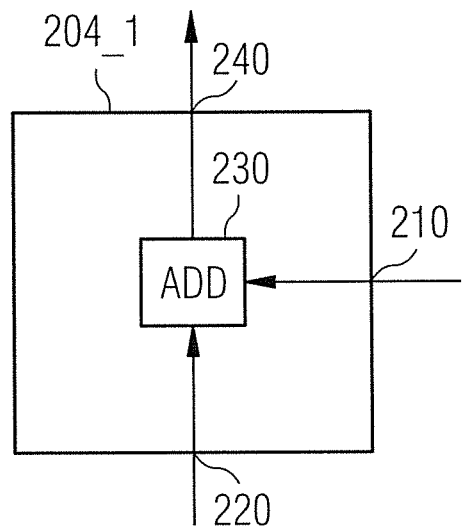
FIG. 4 is a schematic block diagram of a feedback signal generating unit in accordance with one embodiment.

FIG. 4 schematically illustrates a feedback signal generating unit 204_1 according to one embodiment. The feedback signal generating unit 204_1 may receive, at a first input 210, the at least one first quantity (e.g. RSCP and/or Ec/Io and/or SNR) output by the dedicated channel measurement unit 103a and may receive, at a second input 220, the at least one second quantity (e.g. RSCP and/or Ec/Io and/or SNR) output by the common channel measurement unit 205. At an output 240 of the feedback signal generating unit 204_1, a feedback signal is provided. The feedback signal generating unit 204_1 in one embodiment may cell-wisely combine the first quantity with the second quantity to derive the feedback signal.

Alternatively, or more generally, the feedback signal may be some function of the first quantity and the second quantity.

In one embodiment, combining may comprise cell-wise adding the first and second quantities. By way of example, as illustrated in FIG. 4, the feedback signal generating unit 204_1 may comprise an adder 230 configured to add the at least one first quantity and the at least one second quantity. More specifically, the cell-wise DPCH measurement values of the first quantity (e.g. the cell-wise DPCH SNR or DPCH power contribution of each cell) may be added to the CPICH measurement values of the second quantity (e.g. the cell-wise RSCP and/or Ec/Io CPICH measurement values). That way, cell-specific DPCH SNR or power information is incorporated into the network reportings of the UE under consideration. The network may then "blindly" take into account these contributions when deciding on active set updates.

Returning to the example given above, it is assumed that cell A provides exemplary 10 dB more DPCH power or DPCH SNR than cell B. Further, it is assumed that the UE is configured to request the removal of cell A from the active set once the reporting of RSCP and/or Ec/Io of cell A is more than 5 dB below the reporting of RSCP and/or Ec/Io of cell B for more than the TTT period. When the UE moves towards cell B (i.e. the airport), the CPICH RSCP and/or the CPICH Ec/Io of cell A will decrease and may reach a difference of 5 dB to the CPICH RSCP and/or the CPICH Ec/Io of cell B. However, 10 dB more DPCH power or SNR is added to the CPICH RSCP and/or the CPICH Ec/Io of cell A to correct the reportings on cell A. Thus, instead of being removed from the active set at that time, cell A is still reported by the combined RSCP and/or the combined Ec/Io values of the feedback signal to be 5 dB stronger than cell B and therefore remains in the active set.

Of course, there are many more ways of incorporating dedicated channel quality measurement values such as, e.g., the DPCH power or the DPCH SNR into the active set update procedure. According to one embodiment as illustrated in FIG. 4, a feedback signal generating unit 204_2 applying scaling and/or filtering of the first quantity measurement values may be provided. The feedback signal generating unit 204_2 may comprise a filter 260 and/or a scaling unit 250 for processing first quantity measurement values received at the first input 210.

The filter 260 may have a time constant of about 0.1 to 1.0 s or even more in one embodiment. The time constant may be constant or may e.g. variably depend on the velocity of the UE.

The scaling unit 250 of FIG. 4 may be configured to multiply the first quantity measurement values by a scaling factor. The scaling factor determines the degree of correction of the second quantity measurement values by the first quantity measurement values. In one embodiment, the scaling factor may be constant in time and/or identical for all cells. In one embodiment, the scaling factor may be variable and/or different for different cells. By way of example, a scaling factor associated with a cell may depend on the environment of the respective cell, e.g. rural, suburban, urban, and so forth.

For cells of the monitored set, first quantity measurement values of the dedicated channel quality may not be available because in the monitored cells, no dedicated channel (e.g. DPCH) is transmitted. In one embodiment, the UE could generate hypothetical or estimated information about the first quantity measurement values for cells of the monitored set. By way of example, a load estimation (number of users, demands of users for data rate, etc.) on one or more cells of the monitored set could be performed in the UE. Based on the load estimation result, a correction values indicative of a hypothetical or estimated dedicated channel quality can be derived and may then be used as first quantity measurement values to "correct" (i.e. to be combined with) the second quantity measurement values. By way of example, such correction values may comprise a positive or negative bias (e.g. power bias, SNR bias etc.) for each monitored cell depending on whether the monitored cell is estimated to be loaded or unloaded. Correction values obtained by dedicated channel quality estimation may be combined with second quantity measurement values the same way as described herein for first quantity measurement values.

According to one embodiment, a feedback signal generating unit (not illustrated) applying scaling and/or filtering of the second quantity measurement values may be provided. The feedback signal generating unit may comprise a filter (similar to filter 260) and/or a scaling unit (similar to scaling unit 250) for processing second quantity measurement values received at the second input 220. This scaling of second quantity measurement values may also use a variable scaling factor. It may depend e.g. on the environment of the respective cell, e.g. rural, suburban, urban, and so forth, or it may depend on whether the cell is in the active set or in the monitored set. That way, the weight of common channel quality measurement values could be made dependent on the actual cell allocation situation.

Figure 6:
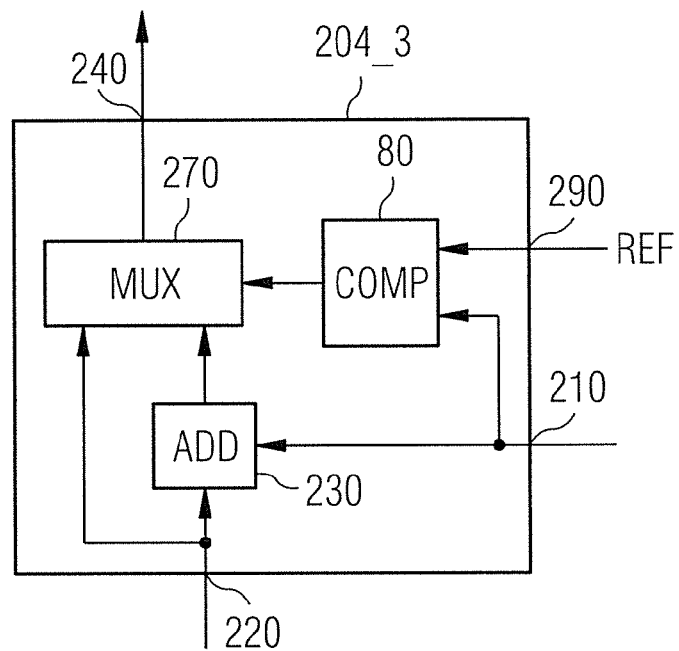
FIG. 6 is a schematic block diagram of a feedback signal generating unit in accordance with one embodiment.

According to one embodiment, a feedback signal generating unit may comprise a comparator to compare the first quantity to an upper or lower threshold. That way, it could e.g. be decided whether the dedicated channel quality measurement values are within reasonable limits in view of the combining/correction operation. By way of example, a possible implementation of a feedback signal generating unit 204_3 comprising a comparator 280 is illustrated in FIG. 6. The feedback signal generating unit 204_3 may further comprise a multiplexer 270 and a reference input 290. At the reference input 290, a reference value REF is input. The comparator 280 compares the reference value REF with the first quantity measurement values indicative of a dedicated channel quality. If the first quantity measurement value is greater than the reference value REF, it is assumed that the correction of the reporting values by dedicated channel quality measurement values would be unreasonably high. In this case, the comparator 280 may control the multiplexer 270 to output the uncorrected second quantity measurement values received at input 220. Otherwise, if the first quantity measurement value is less than the reference value REF, the comparator 280 controls the multiplexer 270 to output the corrected/combined measurement values received from the adder 230 or any other type of a cell-wise data value combiner.

Figure 5:
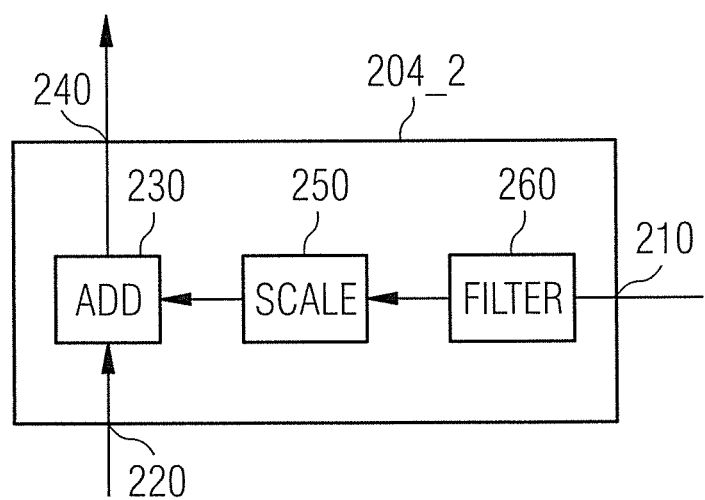
FIG. 5 is a schematic block diagram of a feedback signal generating unit according to one embodiment.

Details of various embodiments described herein could be combined or omitted. By way of example, the feedback signal generating unit 204_3 could be equipped with a scaling unit 250 as shown in FIG. 5, the filter 260 as shown in FIG. 5 could be omitted, and so forth.

According to some embodiments, the dedicated channel quality measurement values may be reported to the network. That is, the dedicated channel quality measurement values may be transmitted to the network by the feedback signal output by the feedback signal generating unit. In this case, depending on the standard under consideration, it may be desirable to modify the standard. By way of example, the UMTS standard may need to be modified if the feedback signal generating unit 104, 204 is configured to additionally and separately report DPCH quality measurement values by the feedback signal to the network. The network controller should then also taken into account these additional DPCH quality measurement values for UE cell allocation procedures.

Figure 7:
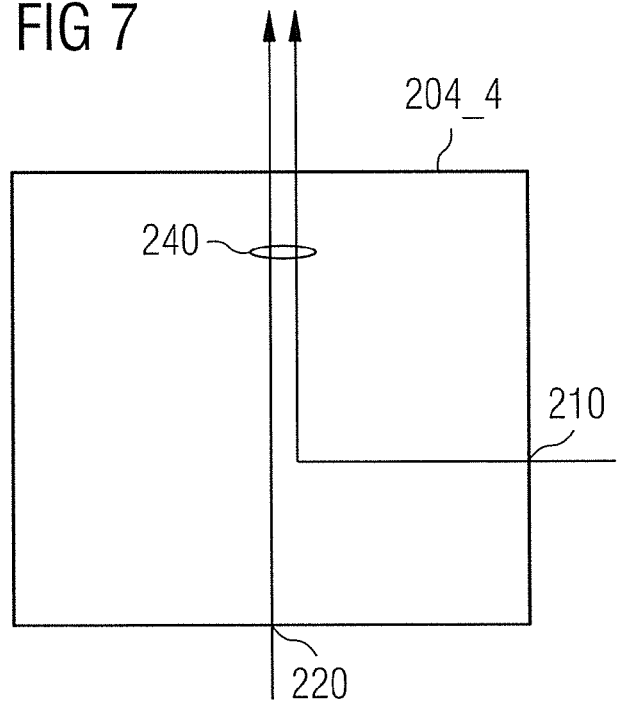
FIG. 7 is a schematic block diagram of a feedback signal generating unit in accordance with one embodiment.

FIG. 7 schematically illustrates a feedback signal generating unit 204_4 according to one embodiment. The feedback signal generating unit 204_4 comprises the first and second inputs 210, 220 for receiving cell quality measurement values as described above. However, these measurement values are not combined. Instead, both the cell quality measurement values obtained from common pilot channel measurements and the cell quality measurement values obtained from dedicated channel measurements are reported via the feedback signal to the network. In other words, the cell-specific second quantity measurement values obtained by the common pilot channel measurements are reported without modification and the cell-specific first quantity measurement values obtained by the dedicated channel measurements are additionally reported to the network.

Figure 8:
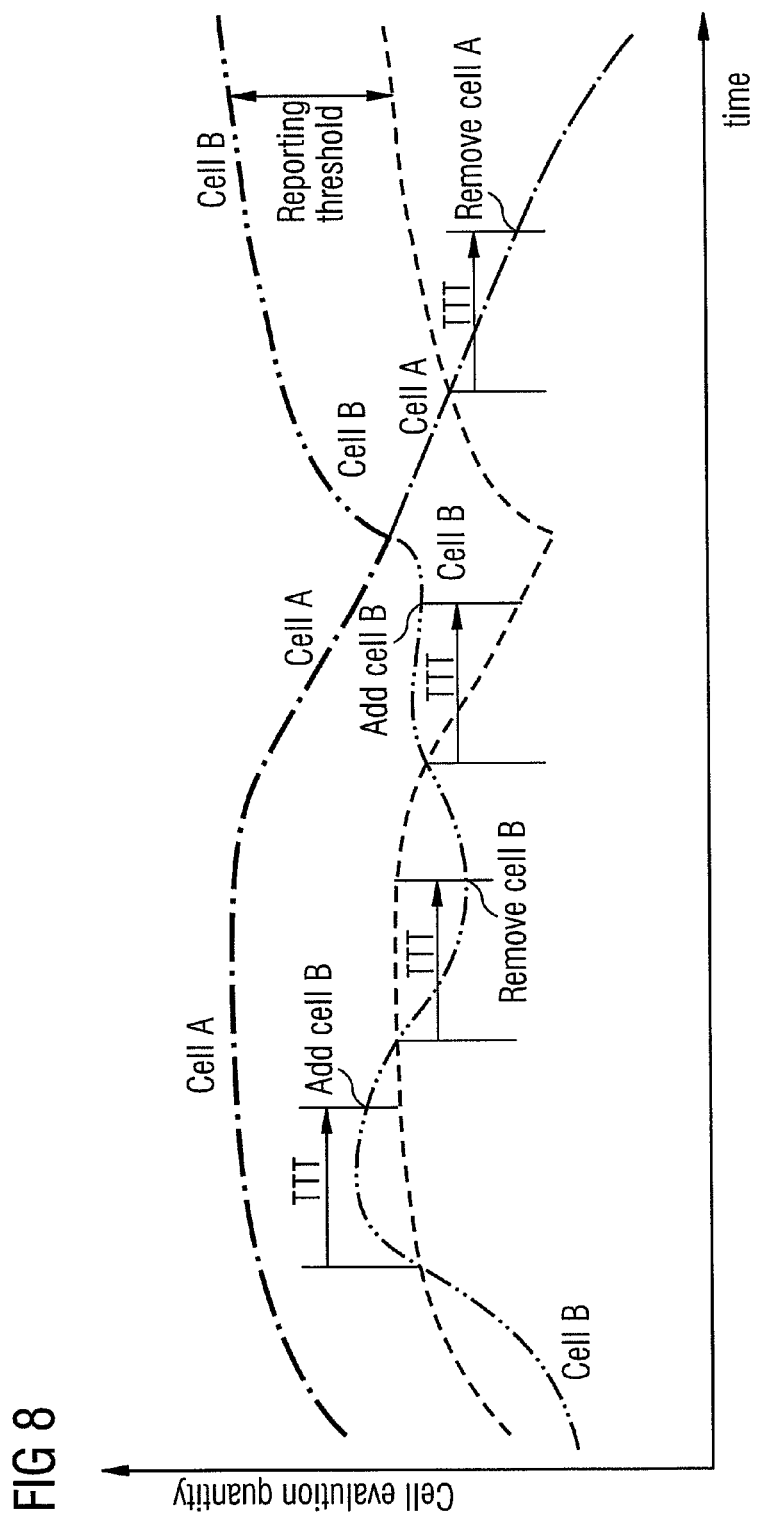
FIG. 8 is a diagram illustrating an example for measurement reporting and active set update in accordance with one embodiment.

FIG. 8 is a diagram illustrating an example for measurement reporting to the network and active set update. The example is based on the UMTS standard. However, the following description is not restricted to UMTS and aspects of the example are applicable to other standards.

On the vertical axis of the diagram, a cell evaluation quantity used by the network to decide on active set update is depicted, and the horizontal axis refers to time. The cell evaluation quantity may be one of the quantities reported by the UE to the network. By way of example, in UMTS the UE reports the RSCP and the Ec/Io of the CPICH. The network can then choose which of these quantities it uses for cell allocation procedures, e.g. for active set updates or other handover procedures. It can also use both of these quantities for such procedures. Thus, the cell evaluation quantity may e.g. be the reported RSCP, the reported Ec/Io, a quantity computed on the basis of the reported RSCP and the reported Ec/Io and so forth. As explained above, according to embodiments described herein, the reported quantity or quantities (i.e. the third quantity transmitted by the feedback signal) may comprise a contribution of the first quantity indicative of a channel quality of the dedicated channel (DPCH) or may even be identical to the first quantity. In UMTS, modified RSCP and modified Ec/Io values depending on the DPCH quality may be reported for each cell and the (cell-specific) cell evaluation quantity may be identical or may depend on these reported modified RSCP and Ec/Io values.

The network may decide on the best cell based on the cell evaluation quantity. The best cell may be decided to be the cell having a maximum value of the cell evaluation quantity. Without loss of generality, for the following example it is assumed the best cell is the cell having a maximum reported RSCP. In FIG. 8 cell A has maximum reported RSCP. The network then sets a reporting threshold defining a reporting range relative to the cell evaluation quantity of the best cell (i.e. in this example the reported RSCP of cell A). By way of example, the reporting threshold may be 5 dB below the maximum cell evaluation quantity. A cell within this range should be in the active set, a cell below the reporting threshold should not be in the active set.

To avoid too frequent active set updates, some hysteresis or time to trigger (TTT) may be defined. When a cell enters or leaves the reporting range, a timer is started and only when the TTT is reached the UE requests from the network that the cell is to be added or removed, respectively. An exemplary devolution with two cells A and B is shown in FIG. 8. First, there is only cell A in the active set and cell A defines the reporting threshold. Then, cell B is added to the active set but then removed again. Cell B is then added a second time to the active set and this time cell B finally becomes the best cell (at the intersection of the cell evaluation quantity of cell A and cell B) and defines then the reporting threshold. Subsequently, cell A becomes worse and is then removed from the active set.

As apparent from the above, the active set update procedures and the times of their initiation sensitively depend on the cell evaluation quantity and thus on the reportings of cell-specific measurement values from the UE to the network. As the reportings from the UE are dependent on dedicated channel quality measurement values, the cell evaluation quantity is also dependent on dedicated channel quality information. Therefore, the cell-specific dedicated channel quality measurements by dedicated channel measurement unit 103*a* have an effect on the cell allocation procedures (i.e. handover procedures) for the UE under consideration.

It is to be noted that cell allocation decisions of the network may additionally depend on further information not discussed in detail herein. By way of example, in addition to the evaluation of the reported quantities, e.g. based on the cell evaluation quantity as explained above, the network may further base the handover decision on additional knowledge such as, e.g. information about the number of users in a cell or the amount of free resources/available power in a cell and so on.

The concept described above can also be applied to networks (standards) with a single serving cell such as OFDM networks (standards). By way of example, the LTE standard uses only one serving cell for each UE. In this case, no first quantity values and second quantity values for multiple cells exist, because there is only one cell with a dedicated downlink channel and a common pilot channel. However, apart from this difference, also in this case the concepts described above are applicable, i.e. reportings to the network transmitted by the feedback signal may include measurement information about the dedicated channel quality. Again, this information may either be used to modify existing reportings (e.g. as illustrated in FIGS. 4 to 6) or may be added as separate reportings to the existing reportings (e.g. as illustrated in FIG. 7). The network, that decides on possible candidate cells for a hard handover, uses these reportings for its decision. To this end, by way of example, the network and/or the UE could generate hypothetical or estimated information about the dedicated channel quality for possible candidate cells for the hard handover decision. This hypothetical or estimated information about the dedicated channel cell quality of candidate cells may e.g. be an estimated power or an estimated SNR at the UE under consideration for the candidate cell. Referring again to FIG. 8, such hypothetical or estimated information could be compared to the (serving) cell evaluation quantity to decide on a hard handover, whereby, different to FIG. 8, in this case only one cell (either cell A or cell B) can be decided as serving cell (i.e. the "active set" is limited to one cell, and only cell replacement is possible).

In one embodiment the reportings by the feedback signal to the network may be periodical. Further, in one embodiment the reportings by the feedback signal may be event-based. By way of example, returning to FIG. 8, the network may communicate the reporting threshold to the UE. The UE may continuously measure the cell-specific first and second quantity and may derive the cell evaluation quantity (e.g. a modified second quantity such as the modified RSCP or Ec/Io) based on the measurement values. Then the UE may decide on the best cell (cell A in FIG. 8) and may monitor other cells of the active set and of the monitored set (e.g. cell B in FIG. 8) in view of entering or leaving the reporting range. Such events, delayed and confirmed by TTT, may trigger requests for active set updates, e.g. adding or removing cells. Such requests may then be reported by the feedback signal to the network, and the network may decide on these requests. Event-based handover procedures and/or UE based cell quality evaluation may decrease or minimize the amount of data to be transmitted by the feedback signal to the network and the overall signaling expenditure in the network.

Figure 9:
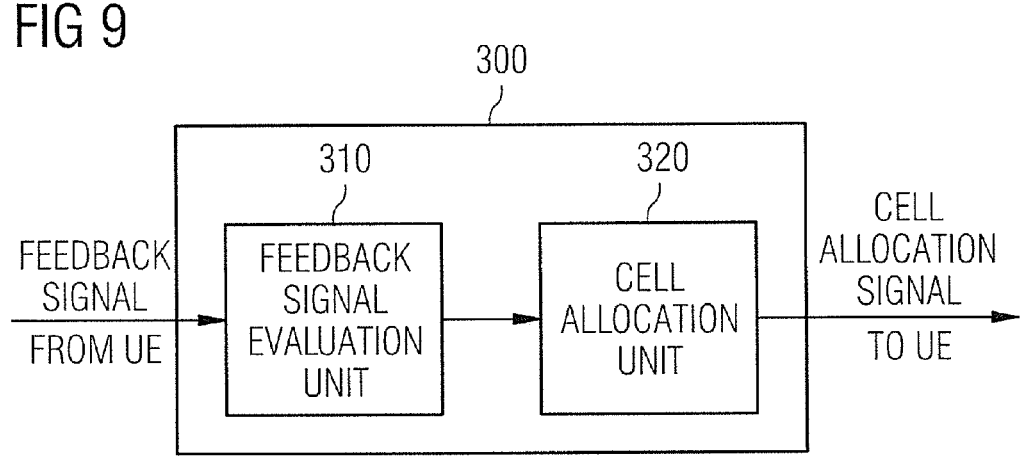
FIG. 9 is a schematic block diagram of a radio network controller in accordance with one embodiment.

A network controller of a cellular network according to one embodiment is illustrated in FIG. 9. The network controller 300 may comprise a feedback signal evaluation unit 310 configured to evaluate at least one cell-specific first quantity indicative of a channel quality of a dedicated downlink channel received at an UE. As described above, the cell specific first quantity (e.g. power or SNR) may be reported via the feedback signal from the UE under consideration to base station(s) and communicated from the base station(s) to the network controller 300. The feedback signal may further report at least one cell-specific second quantity indicative of a channel quality of a common pilot channel, see e.g. the feedback signal generating unit illustrated in FIG. 7.

The evaluation procedure performed by the feedback signal evaluation unit 310 may e.g. be similar as described above. That is, the feedback signal evaluation unit 310 may compute a cell evaluation quantity based on the first quantity or based on the first quantity and the second quantity.

The network controller 300 may further comprise a cell allocation unit 320 configured to allocate cells to the connection of the UE under consideration based on the evaluation result. By way of example, the cell allocation unit 320 may receive the cell evaluation quantity, set a reporting threshold and may perform active set update procedures as described above (see e.g. FIG. 8). Thus, cell allocation depends on the cell-specific first quantity.

The cell allocation unit 320 may return a cell allocation signal to the UE. The cell allocation signal may be an active set update command or a confirmation/rejection control signal to UE active cell update requests.

Figure 10:
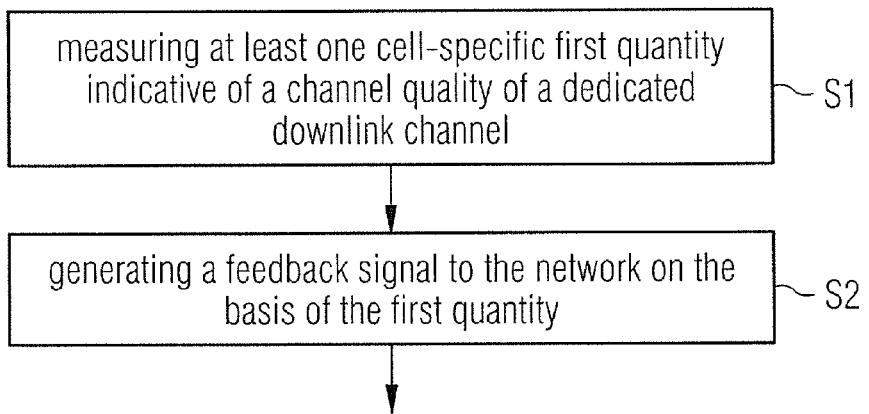
FIG. 10 is a diagram illustrating a method of generating the feedback signal for cell allocation in a radio receiver apparatus of a cellular network in accordance with one embodiment.

According to FIG. 10, a method for a radio receiver apparatus of a cellular network that allocates one or more cells to a particular connection of the radio receiver apparatus based on a feedback signal received from the radio receiver apparatus may comprise, inter alia, the following steps:

In step S1, at least one cell-specific first quantity indicative of a channel quality of a dedicated downlink channel is measured.

Then, in step S2, the feedback signal is generated based on the first quantity. That way, the cell-specific first quantity indicative of a channel quality of a dedicated downlink channel affects handover procedures for the UE.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A radio receiver apparatus of a cellular network, wherein the network allocates one or more cells to a connection of the radio receiver apparatus based on a feedback signal received from the radio receiver apparatus, the radio receiver apparatus comprising: a first measurement unit configured to measure at least one cell-specific first quantity indicative of a channel quality of a dedicated downlink channel of a first cell; a second measurement unit configured to measure at least one cell-specific second quantity indicative of a channel quality of a common pilot channel of the first cell, wherein the cell-specific second quantity comprises a signal power or a signal-to-noise ratio, or a combination thereof; and a feedback signal generating unit configured to generate the feedback signal, wherein the feedback signal generating unit comprises a first input to receive the at least one cell-specific first quantity, a second input to receive the at least one cell-specific second quantity and an adder having inputs coupled to the first input and the second input, and the adder further comprising an output to provide at least one cell-specific third quantity, wherein values of the third cell-specific quantity comprises a cell-wise summation of the at least one cell-specific first quantity and the at least one cell-specific second quantity, and wherein the values of the third cell-specific quantity are transmitted by the feedback signal.

2. The radio receiver apparatus of claim 1, wherein the at least one cell-specific first quantity is indicative of a power of the dedicated downlink channel.

3. The radio receiver apparatus of claim 1, wherein the at least one cell-specific first quantity is indicative of a signal-to-noise ratio of the dedicated downlink channel.

4. The radio receiver apparatus of claim 1, wherein the feedback signal generating unit comprises a scaling unit having an input coupled to the first input or the second input, wherein the scaling unit is configured to scale a quantity of the at least one cell-specific first quantity or the at least one cell-specific second quantity.

5. The radio receiver apparatus of claim 1, wherein the feedback signal generating unit comprises a filter unit having an input coupled to first input or the second input, wherein the filter unit is configured to filter the at least one cell-specific first quantity or the at least one cell-specific second quantity.

6. The radio receiver apparatus of claim 1, wherein the feedback signal generating unit comprises a comparator having inputs coupled to the first input and a reference value input receiving a reference value, wherein the comparator is configured to output a first state if the at least one cell-specific first quantity exceeds the reference value, and a second, different state otherwise.

7. The radio receiver apparatus of claim 1, wherein the feedback signal generating unit is configured to compute the at least one cell-specific third quantity depending on a parameter that indicates whether the cell under consideration is a cell allocated to the connection or a cell not allocated to the connection.

8. A method of operating a radio receiver apparatus in a cellular network, wherein the cellular network allocates one or more cells to a connection of the radio receiver apparatus based on a feedback signal received from the radio receiver apparatus, comprising: measuring at least one cell-specific first quantity indicative of a channel quality of a dedicated downlink channel of a first cell; measuring at least one cell-specific second quantity indicative of a channel quality of a common pilot channel of the first cell, wherein the cell-specific second quantity comprises a signal power or a signal-to-noise ratio, or a combination thereof; computing values of at least one cell-specific third quantity, wherein computing the values of at least one cell-specific third quantity comprises cell-wise adding of the first cell-specific quantity and the second cell-specific quantity; generating the feedback signal based on the third cell-specific quantity; and transmitting the values of the third cell-specific quantity by the feedback signal.

9. The method of claim 8, further comprising:
measuring the at least one cell-specific first quantity for cells of an active set, wherein the active set comprises cells that are allocated to the connection of the radio receiver apparatus.

10. The method of claim 8, wherein computing the at least one cell-specific third quantity further comprises one or more of the operations of scaling the first quantity or the second quantity prior to adding, filtering the first quantity prior to adding, and comparing the first quantity with a reference value and then selectively employing the first quantity in the computing based on a comparison result.

11. The method of claim 8, wherein the cellular network is a network using soft handover.

12. The method of claim 8, wherein the cellular network is a network using hard handover.

13. A radio receiver apparatus of a cellular network, wherein the cellular network uses soft handover by active set updating based on a feedback signal received from the radio receiver apparatus, the radio receiver apparatus comprising: a first measurement unit configured to measure a first quantity indicative of a channel quality of a dedicated downlink channel for at least each cell of the active set; a second measurement unit configured to measure a second quantity indicative of a channel quality of a common pilot channel for at least each cell of the active set, wherein the second quantity comprises a signal power or a signal-to-noise ratio, or a combination thereof; and a feedback signal generating unit configured to derive values of a third quantity by the operation of cell-wise adding of the first quantity and the second quantity for at least each cell of the active set, and wherein the third quantity values are reported to the cellular network by the feedback signal.

14. The radio receiver apparatus of claim 13, wherein the second measurement unit is configured to measure the second quantity also for cells of a monitored set, wherein the cells of the monitored set are not contained in the active set.

* * * * *